United States Patent
Bosshart et al.

[11] Patent Number: 5,815,697
[45] Date of Patent: Sep. 29, 1998

[54] CIRCUITS, SYSTEMS, AND METHODS FOR REDUCING MICROPROGRAM MEMORY POWER FOR MULTIWAY BRANCHING

[75] Inventors: Patrick W. Bosshart; Jonathan H. Shiell, both of Plano, Tex.

[73] Assignee: Texas Instruments Incorporated, Dallas, Tex.

[21] Appl. No.: 781,570

[22] Filed: Jan. 9, 1997

[51] Int. Cl.[6] .................... G06F 9/28; G11C 7/00
[52] U.S. Cl. ................ 395/583; 395/750.03; 711/5
[58] Field of Search ............... 395/583, 750.01, 395/595, 571, 405, 750.03; 711/5

[56] References Cited

U.S. PATENT DOCUMENTS

| | | | |
|---|---|---|---|
| 4,587,611 | 5/1986 | Amdahl et al. | 395/598 |
| 4,601,018 | 7/1986 | Baum et al. | 365/230.04 |
| 4,907,192 | 3/1990 | Kaneko | 395/583 |
| 5,036,493 | 7/1991 | Nielsen | 365/230.03 |
| 5,377,335 | 12/1994 | Keller et al. | 395/395 |
| 5,404,543 | 4/1995 | Faucher et al. | 395/750 |
| 5,559,986 | 9/1996 | Alpert et al. | 395/471 |
| 5,657,285 | 8/1997 | Rao | 365/203 |

*Primary Examiner*—Parshotam S. Lall
*Assistant Examiner*—Viet Vu
*Attorney, Agent, or Firm*—Robert D. Marshall, Jr.; James C. Kesterson; Richard L. Donaldson

[57] ABSTRACT

A processor embodiment comprises a microprogram memory circuit (12) comprising a number of separately energizable banks (14a, 14b). Each of the number of separately energizable banks is operable to concurrently output at least one microinstruction. The processor further comprises circuitry for forming a microaddress for addressing the microprogram memory. This circuitry includes circuitry (26, 28) for identifying a value of a first bit (A0) and of a second bit (A1), and the microaddress comprises the first bit, the second bit, and a plurality of main bits (20c). Further, the processor includes circuitry for selectively energizing (24, 13a, 13b) a subset of the separately energizable banks in response to the value of the first bit, and the subset is less than the number of separately energizable banks. Still further, the processor includes circuitry (16) for outputting a first set of microinstructions from the subset of the separately energizable banks. Lastly, the processor includes circuitry (18) for selecting a subset of the first set of microinstructions in response to the value of the second bit, wherein the subset is less than the number of the first set of microinstructions.

16 Claims, 2 Drawing Sheets

CIRCUITS, SYSTEMS, AND METHODS FOR REDUCING MICROPROGRAM MEMORY POWER FOR MULTIWAY BRANCHING

TECHNICAL FIELD OF THE INVENTION

The present embodiments relate to microprocessor systems, and are more particularly directed to circuits, systems, and methods for reducing microprogram memory power for multiway branching.

BACKGROUND OF THE INVENTION

The embodiments described below involve the developing and ever-expanding field of computer systems and microprocessors. As these fields advance, considerations of efficiencies bear on all aspects of operation and design. One key example of such considerations is efficiency of microcode. Another key example is power management, that is, reducing the power consumed by the computer system, including both its microprocessor(s) as well as its peripherals. In each instance of power savings, there is enhanced efficiency. For example, in the instance of portable computers, such as laptops and notebook computers, it is desirable to improve power efficiency so that the rechargeable power supply lasts a greater amount of time between recharge periods. Therefore, various techniques have arisen to reduce power consumption in these types of computers. Power consumption techniques arise in the context of desktop computers as well. Still further, the combination of portable computers and desktop computers in so-called docking bay configurations also benefit from power adjustments, particularly in instances where the portable computer is removed from the dock, thereby changing the power consumption considerations. These varying configurations each may benefit from improved power performance.

Microprocessors include various components, each of which contribute to the overall power consumption of the processor. One considerable component is the microprogram memory, which typically in the art is a read only memory referred to as the microROM or microcode ROM. The microprogram memory is a fundamental unit of the microprocessor which receives a "microaddress" and, in response, outputs a "microinstruction." The microinstruction is a multiple bit signal, and the value of most if not all of those bits is used to control some aspect of the microprocessor. The present embodiments improve upon the configuration of the microprogram memory and its related circuits and systems. Before addressing the particular improvements, the following further details the concepts of forming the microaddress for the next microinstruction from the current microinstruction. Particularly, in horizontal always-branch microprocessors, each microinstruction includes at least one microaddress of the next potential microinstruction to be output by the microprogram memory. As detailed below, microprocessor systems using such a microprogram memory are improved upon by the following embodiments.

In prior art horizontal always-branch microprocessors, the microaddress included within the microinstruction includes some type of main portion, a least significant microaddress bit A0, and a next-to-least significant microaddress bit A1, all of which are often concatenated to form the next microaddress for the microprogram memory. The generation of the A0 and A1 bits varies among processors, but in general these bits are derived from some type of control signals in the previous microinstruction. Thus, with respect to the bits for forming the next microaddress, a typical microinstruction output by the microprogram memory takes the following form shown diagrammatically below:

|main portion|A1 bit select|A0 bit select|

The A1 and A0 bit select portions of the microinstruction cause the actual selection of the particular values of the A0 and A1 bits for the next microaddress. For example, these selection fields may each select a respective variable condition code, in which case the next microaddress would take the form of:

|main portion|selected code #1|selected code #2|

As a result, the combination of the two selected condition codes gives rise to a branch to one of four different next microaddresses; thus, in the art, this scenario is referred to as a 4-way branch. As another example, one of the two select fields may choose a fixed value, while the other chooses a condition code, thereby resulting in one of the following forms:

|main portion|selected code|fixed value|

|main portion|fixed value|selected code|

In either form, therefore, the combination of one variable condition code with a fixed value gives rise to a branch to one of two different next microaddresses; thus, in the art, this scenario is referred to as a 2-way branch. As a final example, both the A0 and the A1 bit select fields may choose a fixed value. For example, in some machines, a fixed value is actually included within the microinstruction, and either or both selection fields can select this fixed value from the microinstruction so that the selected fixed value becomes the A1 bit or the A0 bit of the next microaddress. Note, where two fixed values are combined with the main portion, this scenario is referred to as a 1-way branch.

In many current prior art architectures, a microaddress branch, whether 4-way-, 2-way, or 1-way, is used to address the same width of the microprogram memory and the microprogram memory is four microinstructions wide. For example, where a microinstruction is 256 bits, the microprogram memory is 1024 bits wide. Given this example, the bits of the microaddress other than the A1 and A0 bits address the microprogram memory to output four microinstructions for a total of 1024 bits. Next, the A1 and A0 bits are used to select one of the four output microinstructions.

As detailed below, the inventors of the present embodiments now appreciate various inefficiencies in the above approach including the unnecessary power consumption in operating the microprogram memory to always output all microinstructions. Therefore, there arises a need to address the drawbacks of current processors, particularly in view of these as well as other inefficiencies.

SUMMARY OF THE INVENTION

The preferred embodiments relate to microprocessor systems, and are more particularly directed to circuits, systems, and methods for reducing microprogram memory power for multiway branching. In a processor embodiment, the processor comprises a microprogram memory comprising a number of separately energizable banks. Each of the number of separately energizable banks is operable to concurrently output at least one microinstruction. The processor further comprises circuitry for forming a microaddress for addressing the microprogram memory. This circuitry includes circuitry for identifying a value of a first bit and of a second bit, and the microaddress comprises the first bit, the second bit, and a plurality of main bits. Further, the processor includes circuitry for selectively energizing a subset of the separately energizable banks in response to the value of the first bit, and the subset is less than the number of separately energizable banks. Still further, the processor includes circuitry for outputting a first set of microinstructions from the subset of the separately energizable banks. Lastly, the processor includes circuitry for selecting a subset of the first set of microinstructions in response to the value of the second bit, wherein the subset is less than the number of the first set of microinstructions. Other circuits, systems, and methods are also disclosed and claimed.

DETAILED DESCRIPTION OF THE PREFERRED EMBODIMENTS

The inventors of the present embodiments have discovered that addressing the full width of the microprogram memory as described in the above Background can be avoided in numerous circumstances by using one or more of the following embodiments. More particularly, the microprogram memory may be broken down into a plurality of banks and, in response to certain circumstances detailed later, less than all of the banks are energized in a given instance. For example, in the illustration above where four microinstructions are output at once by a prior art microprogram memory, one embodiment below breaks down the microprogram memory into two banks, and only one of the two banks is energized in numerous instances. When this occurs, the single energized bank outputs only two microinstructions, as opposed to energizing the entire microprogram memory to output four microinstructions. Thus, one skilled in the art win appreciate that this embodiment represents a fifty percent reduction in power consumption for a given instance of addressing the microprogram memory. The details of this embodiment as well as others are described below.

Figure 1:
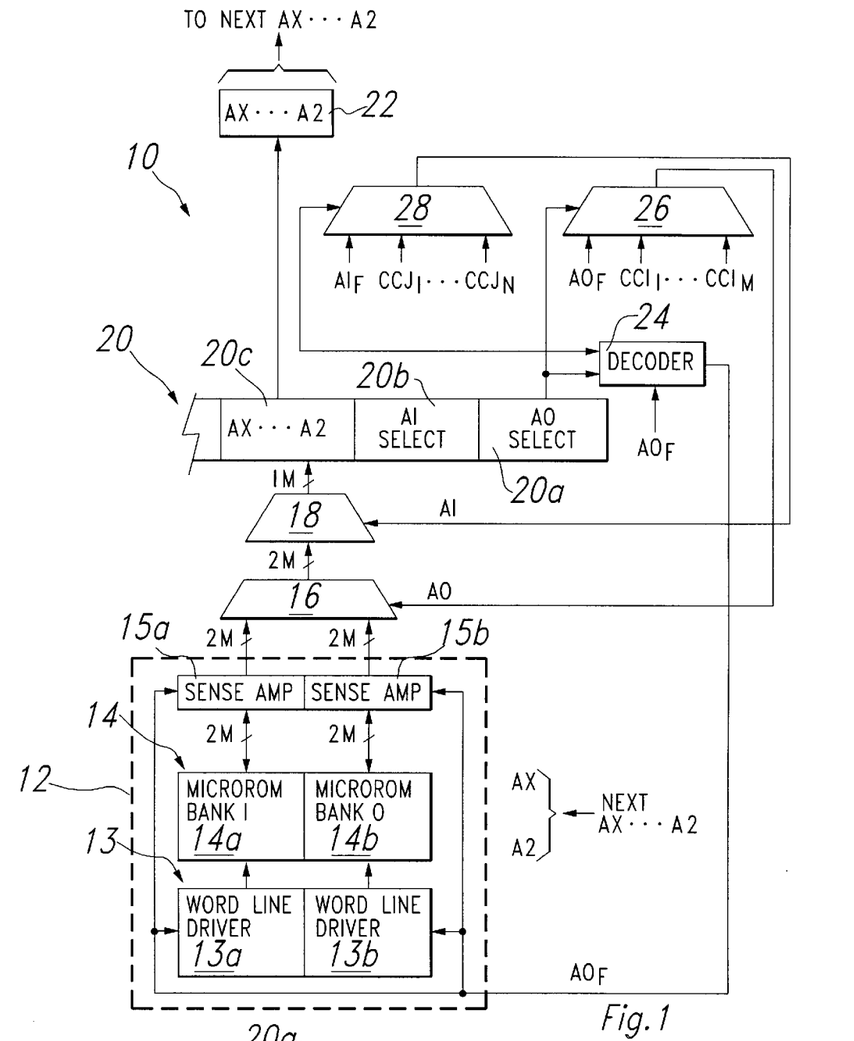
FIG. 1 illustrates a system for addressing a microprogram memory to output a next microinstruction given a current microinstruction which branches to either four, two, or one target microinstructions.

FIG. 1 illustrates a schematic of a microaddress producing system designated generally at 10. System 10 includes a microprogram memory circuit 12. In certain respects, microprogram memory circuit 12 includes circuits known in the art to address microinstructions stored in circuit 12 and output the addressed microinstructions. For purposes of simplification, only three of these circuits are shown: (1) a circuit 14 for storing the microcode, which in this embodiment is shown as a microROM 14; (2) a circuit 13 for energizing the microROM, which in the preferred embodiment is a word line driver; and (3) a sense amplifier 15, for sensing data on bit lines from microROM 14. While these as well as other microprogram memory circuits are known in the art, the present embodiment departs from such known techniques by dividing the storage circuit, which in the instance is microROM 14, into two separately energizable banks 14a and 14b. For purposes of further illustrating the concept of separately energizing banks 14a and 14b, word line driver 13 is also divided into two portions 13a and 13b as is sense amplifier 15 into two portions 15a and 15b. The purpose of this novel architecture is developed below. At this point, note that each of banks 14a and 14b is operable to output two microinstructions in response to a microaddress having bits AX through A2 (detailed later), and further in response to being energized by a respective word line driver 13a or 13b. Once a bank is energized, its data is sensed by the appropriate sense amplifier 15a or 15b. Thus, if word line drivers 13a and 13b both concurrently energize their respective banks 14a and 14b, a total of four microinstructions are sensed by amplifiers 15a and 15b and, therefore, output by microprogram memory circuit 12. However, if only one of word line drivers 13a or 13b energize a respective bank, two microinstructions are output by that bank and, hence, by microprogram memory circuit 12. Note that microROM 14 is illustrated as a read only memory by way only of example, and various other storage circuits could be used, such as random access memories, PLAs, or other storage circuits developed by a person skilled in the art.

The microinstructions output by microprogram memory circuit 12 typically include various information to control many different aspects of processor information. However, for purposes of the present embodiments, the following discussion focuses on those portions of the microinstruction which are used to create the next microaddress. Each set of two microinstructions output by banks 14a and 14b is connected through sense amplifiers 15a and 15b, respectively, to the inputs of a multiplexer 16. Multiplexer 16 is controlled by an additional microaddress bit, A0, to select one of its inputs, thereby outputting only one set of two microinstructions. This set of two microinstructions is connected to the input of a multiplexer 18. Multiplexer 18 is controlled by an additional microaddress bit, A1, to select one of its inputs, thereby outputting only one of the two microinstructions received at its input; in FIG. 1, this output microinstruction is designated at 20. Moreover, as noted above, only three portions of microinstruction 20 used for creating the next microaddress are shown in FIG. 1, namely: (1) a main address portion 20c having bits microaddress bits AX through A2; (2) an A1 bit select field 20b; and (3) an A0 bit select field 20a. At this point, note that the main address portion combines with fixed values in both bit select fields 20a and 20b to form the next microaddress for a 1-way branch microinstruction (also referred to as an "unconditional" branch microinstruction). Each of these fixed values is either derived from, or included within, a corresponding bit select field. However, for 4-way conditional branch microinstructions, only the main portion of microinstruction 20 passes directly to the next microaddress, while the remainder of the next microaddress is generated from the additional items shown in FIG. 1 and detailed below. In addition, note again that numerous additional bits are included within microinstruction 20. For example, under current architectures, a typical microinstruction may be on the order of 256 bits wide, while only a small portion of those bits comprise microaddress bits AX through A2 and the A1 and A0 select fields. Assume, therefore, for the following examples that there are ten microaddress bits AX through A2 and that each of the A1 and A0 select fields are five bits wide.

As noted above, each of the three portions illustrated in microinstruction 20 combines to form a microaddress of the next microinstruction from microprogram memory circuit 12, and that microaddress in its entirety comprises bits AX through A0. Once this entire set of microaddress bits is generated, it is then applied again to the components of FIG. 1 to address the next microinstruction. The process repeats in this manner to successively generate microaddresses and to successively cause microprogram memory circuit 12 to output a corresponding microinstruction. Turning now to the three different portions of the microaddress, bits AX through A2 may be temporarily stored in a storage device 22, or simply connected onward to the address inputs of microprogram memory circuit 12. The A0 and A1 bit select fields are both connected to a decoder 24. Decoder 24 also either receives, or in some instances derives on its own, a value $A0_F$ which represents the value of the A0 bit when that value is "fixed" as defined below. The output of decoder 24 is connected to control banks 14a and 14b such that, as detailed later, one or both is energized in response to the values of the A0 and A1 bit select fields as well as the value of the $A0_F$ bit. The A0 and A1 bit select fields are also connected to the control inputs of respective multiplexers 26 and 28.

Multiplexers 26 and 28 are each connected in a comparable manner. Before discussing the connections of these multiplexers, note generally that multiplexer 26 is connected in a data path to affect the value of microaddress bit A0, while multiplexer 28 is connected in a data path to affect the value of microaddress bit A1.

Turning to multiplexer 26, it receives as its inputs a number, M, of condition codes designated generally as $CCI_1$ through $CCI_M$. Each of condition codes $CCI_1$ through $CCI_M$ depicts any type of single bit code representative of a changeable condition, such as a sign bit, a zero bit, or any other bit controlled either by hardware or software. Further, certain ones of condition codes $CCI_1$ through $CCI_M$ may be connected to multiplexer 26 via storage devices such as latches (not shown). In all events, the value of one these conditions affects the next desired microinstruction if selected and, therefore, affects the value of the next desired microaddress. Multiplexer 26 also receives at one of its inputs the value of A0 in the instances when that value is fixed (again, designated as $A0_F$ with an "F" subscript to depict the fixed nature of the value). The particular details of the $A0_F$ bit are described below in connection with FIGS. 2a and 2b. For current purposes, note that this fixed value may be selected by multiplexer 26 instead of a condition code and, in such an instance, the actual state (i.e., logic 0 or 1) is preferably known at a time earlier than would be a condition code if a condition code were instead selected. Indeed, this timing operates beneficially with decoder 24 and microprogram memory bank selection as detailed below. Lastly, the output of multiplexer 26 is connected to the control input of multiplexer 16.

As mentioned above, multiplexer 28 is connected in a manner comparable to multiplexer 26. Thus, multiplexer 28 receives as its inputs a number, N, of condition codes designated generally as $CCJ_1$ through $CCJ_N$ (again, some of which may be connected through respective storage devices). Like $CCI_1$ through $CCI_M$, $CCJ_1$ through $CCJ_N$ also depict any type of single bit code representative of a changeable condition. Multiplexer 28 also receives at one of its inputs the value of A1 in the instances when that value is fixed (designated as $A1_F$ with an "F" subscript to depict the fixed nature of the value), and also as described below in connection with FIGS. 2a and 2b. Again, note that this fixed value may be selected instead of a condition code and, in such an instance, the actual logic state is preferably known at a time earlier than would be a condition code if a condition code were instead selected. Lastly, the output of multiplexer 28 is connected to the control input of multiplexer 18.

System 10 operates to perform branching for a 4-way conditional branch, a 2-way conditional branch, or a 1-way branch. As noted out the outset, the inventors of the present embodiments have discovered that addressing the full width of the microprogram memory as described above can be avoided in numerous circumstances and, as now described, those instances arise in the context of certain 2-way branches. Thus, each of the three potential branch scenarios (i.e., Sway, 2-way, and 1-way) are described below along with the benefits achieved by system 10 such as reducing power consumption for certain 2-way branches and operating further to accommodate 4-way and 1-way branches as well.

The operation of system 10 to address the next microinstruction following a Sway conditional branch microinstruction is as follows. First, note that, by definition, a Sway branch indicates that from the current microinstruction, there is the possibility of transferring control to one of four different next microinstructions. Thus, assume that the current microinstruction is represented by microinstruction 20. As such, it will include a main address portion AX through A2 as well as the select fields for microaddress bits A1 and A0. Note that the value of the last two microaddress bits, A1 and A0, will combine to select the one of four next microinstructions to which the program control will branch. More particularly, the actual value for bit A1 is determined from the value of a condition code selected from a condition code in $CCJ_1$ through $CCJ_N$, while the actual value for bit A0 is determined from the value of condition codes selected from a condition code in $CCI_1$ through $CCI_M$.

The selection of the corresponding condition codes and remaining operation of system 10 for a 4-way conditional branch is as follows. With respect to microaddress bit A0, the A0 bit select field in microinstruction 20 includes a number of bits sufficient to cause multiplexer 26 to select from one of its plurality of inputs. More particularly, because the current example is a Sway conditional branch, multiplexer 26 is controlled to select only among condition codes $CCI_1$ through $CCI_M$ and, therefore, $A0_F$ is not a candidate for selection during a 4-way conditional branch. To appreciate the operation, assume for example therefore that the A0 select field causes multiplexer 26 to select $CCI_1$. As a result, the value of $CCI_1$ is connected to control multiplexer 16 as discussed later. The A1 bit select field of microinstruction 20 operates in a comparable manner to the A0 bit select field. Thus, the A1 bit select field also includes a number of bits sufficient to cause multiplexer 28 to select from one of its plurality of inputs. Again, because the current example is a 4-way conditional branch, multiplexer 28 is controlled to select only among condition codes $CCJ_1$ through $CCJ_N$ and, therefore, $A1_F$ is not a candidate for selection during a 4-way conditional branch. Assume for the current example that the A1 bit select field causes multiplexer 28 to select $CCJ_1$. As a result, the value of $CCJ_1$ is connected to control multiplexer 18 as discussed later.

In addition to selecting the appropriate condition codes, the A0 and A1 bit select fields are decoded by decoder 24. The result of the decode operation controls the energizing and sensing of microprogram memory circuit 12 to access the next microinstruction. This decode operation of the A0 and A1 bit select fields depends on whether the current microinstruction represents a 4-way, a 2-way, or a 1-way branch and, therefore, the instance of a 4-way branch is discussed here while the 2-way and 1-way branches are discussed later. With respect to the 4-way branch, it is desirable that both banks 14a and 14b of microprogram memory circuit 12 are energized to obtain the next microinstruction. As a result, decoder 24 includes sufficient logic to ascertain from the bit values of the A0 and A1 bit select fields that the current microinstruction is effecting a 4-way branch. Some examples of such values are given later in connection with FIGS. 2a and 2b. At this point, note that decoder 24 decodes the values of the A0 and A1 bit select fields and determines that the current microinstruction represents a Sway branch. As a result, decoder 24 outputs a control signal to microprogram memory circuit 12. Note that this control signal is connected to word line drivers 13a and 13b, as well as sense amplifiers 15a and 15b. Thus, in response to this control signal, word line drivers 13a and 13b energize each corresponding bank 14a and 14b and, also in response to this control signal, sense amplifiers 15a and 15b then sense the data output by the corresponding energized microROM bank.

From the above, note at this point that all signals are now derived to address the next microinstruction from microprogram memory 12. First, AX through A2 are provided directly from the immediately preceding microinstruction. Second, the values of A0 and A1 are provided via multiplexers 26 and 28, respectively. Third, both banks 14a and 14b of microprogram memory circuit 12 are fully energized by word line drivers 13a and 13b. Next, therefore, AX through A2 are applied to microaddress inputs of microprogram memory 12 which, in response, outputs to multiplexer 16 a total of four microinstructions, that is, two microinstructions from each of its banks 14a and 14b. Multiplexer 16 then selects one of the two pairs of microinstructions in response to the value of the A0 bit (i.e., the value of $CCI_1$ in the current example). Thus, multiplexer 16 in effect selects the output of one of the two banks 14a and 14b of microprogram memory circuit 12. The two selected microinstructions (i.e., from either bank 14a or bank 14b) are then connected to the input of multiplexer 18. Multiplexer 18 then selects one of the two microinstructions in response to the value of the A1 bit (i.e., the value of $CCJ_1$ in the current example). Thus, multiplexer 18 in effect selects one microinstruction from the selected bank 14a or 14b of microprogram memory circuit 12, and this selected microinstruction becomes microinstruction 20. Thus, one skilled in the art will appreciate that the operation is now complete such that a first microinstruction has selected one of four target microinstructions in response to the value of two condition codes (i.e., $CCI_1$ and $CCJ_1$ in the current example).

With respect to 2-way and 1-way branching, the selection of the corresponding condition codes and remaining operation of system 10 depends on whether the values for microaddress bits A0 and A1 are fixed or are derived from condition codes. Recall for the 4-way branch that the condition codes $CCI_1$ through $CCI_M$ and $CCJ_1$ through $CCJ_N$ are the source for the values of the next A1 and A0 bits, respectively. For a 2-way branch, however, only one of the A0 and A1 bits is derived from one of the sets of condition codes, while the other of those bits is fixed based on its respective A1 or A0 select field. For example, the value of A1 may be derived from one of the condition codes $CCJ_1$ through $CCJ_N$, while the value of A0 is fixed given the bits in the A0 select field. In the opposite scenario, the value of A0 may be derived from one of the condition codes $CCI_1$ through $CCI_M$, while the value of A1 is fixed given the bits in the A1 select field. To better appreciate this distinction, two techniques for fixing either the A0 or A1 bit are described first in connection with FIGS. 2a and 2b, and then the discussion returns to the 2-way branch techniques involved in the operations of FIG. 1.

Figures 2A, 2B:
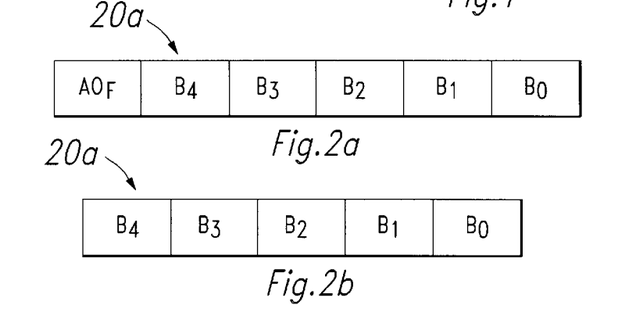
FIG. 2a illustrates a first alternative format for the A0 and A1 bit select fields of FIG. 1.
FIG. 2b illustrates a second alternative format for the A0 and A1 bit select fields of FIG. 1.

FIG. 2a illustrates A0 bit select field 20a, with it understood that the same concepts apply equally as well to A1 bit select field 20b from FIG. 1. Bit select field 20a includes a total of six bits, with five of those bits designated $B_0$ through $B_4$, and the sixth bit being the fixed value, $A0_F$. Recall from the above that during a 4-way branch operation the A0 bit select field controls multiplexer 26 to choose a value of the appropriate condition code. Referring to FIG. 2a, therefore, one skilled in the art will appreciate that bits $B_0$ through $B_4$ provide a total of thirty-two bits which can combine to represent a number for controlling the selection by multiplexer 26. For example, a binary value of 00001 could select CCI1, a value of 00010 could select CCI2, and so forth. Note, however, that one combination of the five bits $B_0$ through $B_4$ must be reserved to indicate that the appropriate selection is of the fixed value, $A0_F$, rather than one of the condition codes. For example, assume that a value of 00000 is reserved in this manner; as a result, when bits $B_0$ through $B_4$ equal 00000, it is known that the fixed bit value, $A0_F$, should be selected rather than one of the condition codes. Returning briefly to FIG. 1, note that the input to multiplexer 26 which is not a condition code is the fixed value $A0_F$, and given the embodiment of FIG. 2a, this value is directly received as the sixth bit from A0 bit select field 20a. Thus, one skilled in the art will appreciate that when $B_0$ through $B_4$ equal 00000, the input value of $A0_F$ is selected by multiplexer 26 and, therefore, this selected value is the next value for microaddress bit A0.

FIG. 2b illustrates A0 bit select field 20a, again with it understood that the same concepts apply equally as well to A1 bit select field 20b. Bit select field 20a includes a total of five bits designated $B_0$ through $B_4$. In this instance, again bits $B_0$ through $B_4$ provide a total of thirty-two bits which can combine to represent a number for selecting the appropriate value (i.e., either fixed value or a condition code). However, in FIG. 2b, the fixed value is not directly embedded in an additional bit. Instead, two bit combinations are reserved to indicate a fixed value. For example, a binary value of 00000 could indicate that $A0_F$ should be fixed at a binary 0, while a binary value of 00001 could indicate that $A0_F$ should be fixed at a binary 1. Thus, the trade-off relative to FIG. 2a is that FIG. 2b is only capable of selecting between thirty condition codes since two combinations are required to select one of two fixed values. On the other hand, the embodiment of FIG. 2b requires one less bit in the microinstruction than does the embodiment of FIG. 2a.

Having described some alternatives for fixing either the A0 or A1 bit in view of its corresponding bit select field, the following discussion now returns to FIG. 1 and the operation of a 2-way branch. At the outset, note that a 2-way conditional branch occurs in one of two different manners, and the particular manner depends on whether it is the A0 bit or the A1 bit which is derived from a fixed value. Accordingly, the following discussion first addresses the instance where the A0 bit is derived from a fixed value while the A1 bit is based on a condition code, and second addresses the instance where the A0 bit is based on a condition code while the A1 bit is derived from a fixed value.

The operation of system 10 when the A0 bit is derived from a fixed value while the A1 bit is based on a condition code is as follows. First, and as in the instance of a 4-way branch, the microaddress main portion 20c forms microaddress bits AX through A2, and A1 select field 20b causes multiplexer 28 to select the appropriate condition code to output as the next value for the A1 bit. In contrast to the 4-way branching however, in the current instance decoder 24 determines that the current microinstruction is a 2-way branch for which the A0 bit is a fixed value. Given the examples of FIGS. 2a and 2b, one skilled in the art could easily develop a decoding architecture to accomplish this operation. For example, given the example of FIG. 2a, decoder 24 could determine whether the bits of A0 bit select field 20a are all zeroes, in which case it is known that the A0 bit is a fixed value as opposed to a condition code. Once decoder 24 makes this determination, it connects the value of the fixed value, $A0_F$, to microprogram memory circuit 12 and, therefore, this signal controls word line drivers 13a and 13b as well as sense amplifiers 15a and 15b. In response to the particular value of $A0_F$, only one of the two word line drivers 13a or 13b energizes its respective bank 14a or 14b of microprogram memory circuit 12. Next, bits AX through A2 from the current microinstruction 20 are applied to microprogram memory circuit 12 but, because only one of its two banks are energized, microprogram memory circuit 12 outputs only two microinstructions instead of four as in the case of a 4-way branch. Thus, in comparison to the 4-way branch, the current instance consumes only one-half (or approximately that amount) of the power consumed by the 4-way branch, thereby representing a vast increase in efficiency. Note further that the described operation is unlikely to cause any timing penalty because under typical architectures the value of a fixed next address bit ($A0_F$ in the current example) is known before the value of a selected condition code. Thus, in the current example, while the condition code for the A1 bit is being ascertained, microprogram memory circuit 12 can be addressed to output the next two microinstructions as described above. Indeed, once the selected bank of microprogram memory circuit 12 outputs its two microinstructions, note further that the same fixed value of A0 operates to control multiplexer 16 to select those two microinstructions and output them to multiplexer 18. Thus, when the value of the selected condition code is eventually available to become the value of the A1 bit, it is applied to multiplexer 18 to select between the two microinstructions output by the sole energized bank of microprogram memory circuit 12. Thus, one skilled in the art will appreciate that the operation is now complete such that a first microinstruction has selected one of two target microinstructions in response to the value of a fixed value for the A0 bit and the condition code (i.e., one of $CCJ_i$ through $CCJ_N$ in the current example) for the A1 bit.

The operation of system 10 when the A1 bit is derived from a fixed value while the A0 bit is based on a condition code is similar in certain respects to the 4-way branch as well as to the alternative 2-way branch described above. Again, the microaddress main portion 20c forms microaddress bits AX through A2 for the next microinstruction. However, at this point the value of the next A0 bit is unknown because it depends on a condition code which is not yet selected and/or the value of the particular condition code is not necessarily finalized. Thus, the timing is such that the value of the A0 bit is not yet available to cause word line drivers 13a and 13b to energize only one of the two microprogram memory banks. Consequently, in the present embodiment, rather than awaiting the next value of the A0 bit, both banks 14a and 14b of microprogram memory circuit 12 are energized by respective word line drivers 13a and 13b. Thus, each bank outputs a pair of microinstructions which are sensed by sense amplifiers 15a and 15b, respectively and output to multiplexer 16. At some point, however, the value of the A0 bit becomes known. At this point, the value of the A0 bit causes multiplexer 16 to select one pair of microinstructions and connect them to multiplexer 18. From this point, multiplexer 18, already having access to the fixed value of the A1 bit, selects one of the two microinstructions at its input and outputs that microinstruction as the next microinstruction 20. Again, therefore, one skilled in the art will appreciate that the operation is now complete such that a first microinstruction has selected one of two target microinstructions in response to the value of a fixed value for the A1 the and the condition code value (i.e., one of $CCI_1$ through $CCI_M$ in the current example) for the A0 bit.

Having described both the 4-way and 2-way branch operation of system 10, yet another alternative operation is that of the 1-way branch, and is as follows. Recall for the 1-way branch that both the A1 and A0 bits are fixed values. Note, therefore, that since the A0 bit is again a fixed value, system 10 can operate to reduce power consumption in the same manner as it does for the above-described 2-way branch where the A0 bit is a fixed value. Thus, for a 1-way branch, decoder 24 determines that the A0 bit is a fixed value and connects that value to microprogram memory circuit 12. As a result, only one of the two word line driver portions 13a and 13b respond to energize one of the two microROM banks 14a and 14b. Again, one of the two sense amplifiers 15a and 15b sense the corresponding energized bank and output two microinstructions to multiplexer 16 which, at the control of the fixed value of the A0 bit, outputs those two microinstructions to multiplexer 18. Next, multiplexer 18 selects between its two input microinstructions in response to the fixed value of the A1 bit, and the selected microinstruction is once again output to be the next microinstruction 20.

From the above, it may be appreciated that the above embodiments vastly improve over the prior art, such as by reducing power consumption by fifty percent in various instances. Further, the above provides circuits, systems, and methods for reducing microprogram memory power while operable to perform 4-way, 2-way, and 1-way multiway branching. Moreover, it should be noted that one of the two 2-way branching scenarios described above is clearly preferable, that is, the one in which the A0 bit is fixed while the A1 bit is variable (e.g., not fixed since it depends on the value of a subsequently chosen condition code). Given such an embodiment, one skilled in the art should note that in an architecture using the above, the person or persons creating the actual microcode should map the microinstructions in a runner to take as much advantage of the power savings feature as possible. Thus, where a 2-way branch is to be coded, the programmer should strive, given the embodiments above, to have the selected condition code appear as the A1 bit as opposed to the A0 bit. Of course, if the operation of the bits were reversed (i.e., the A1 bit controlled memory bank selection), then the coding is likewise to be reversed.

Figure 3:
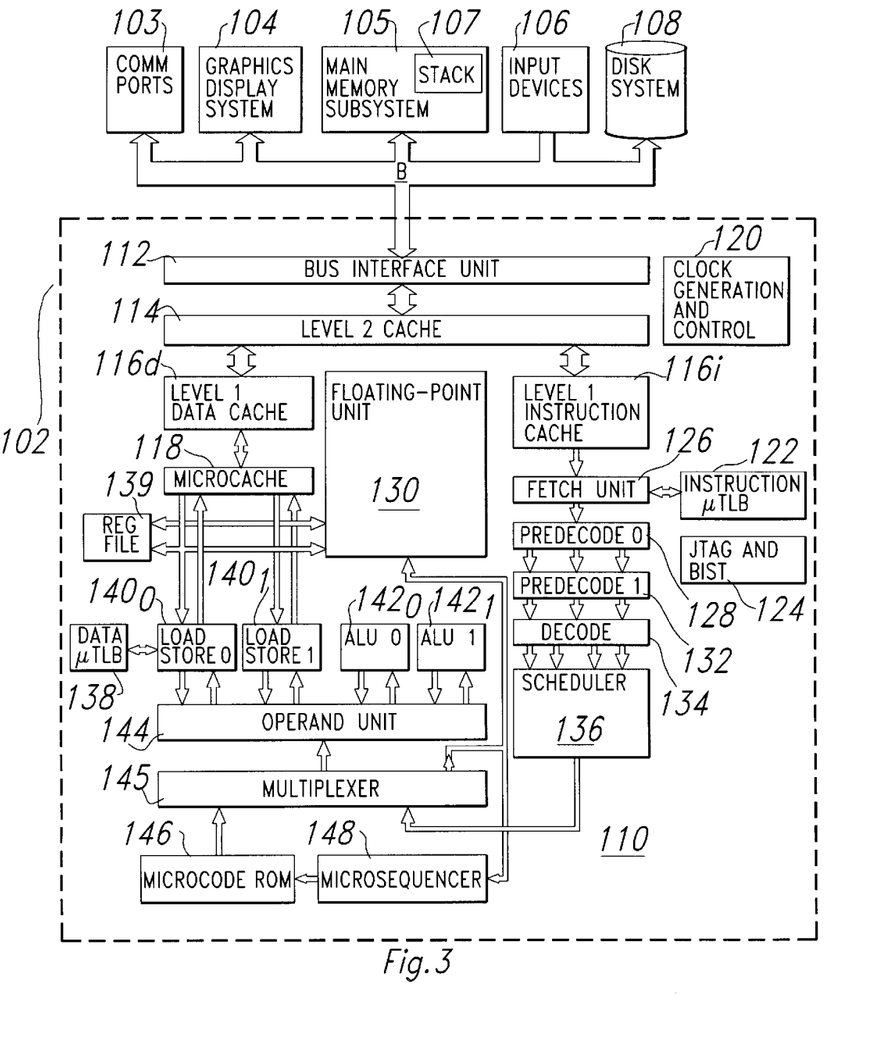
FIG. 3 illustrates an exemplary data processing system within which the preferred embodiments are implemented.

Having described the above embodiments, FIG. 3 illustrates a block diagram of a microprocessor embodiment into which the above embodiments may be incorporated. Referring now to FIG. 3, an exemplary data processing system 102, including an exemplary superscalar pipelined microprocessor 110 within which the preferred embodiment is implemented, will be described. It is to be understood that the architecture of system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures.

Microprocessor 110, as shown in FIG. 3, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM) and includes a stack 107, input devices 106 (including keyboard, a pointing device, and the interface circuitry therefor), and disk system 108 (which may include hard disk drives, floppy disk drives, and CD-ROM drives). It is therefore contemplated that system 102 of FIG. 3 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes a bus interface unit ("BIU") 112 that is connected to bus B, and which controls and effects communication between microprocessor 110 and the other elements in system 102. BIU 112 includes the appropriate control and clock circuitry to perform this function, including write buffers for increasing the speed of operation, and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the bus clock from bus B; the frequency of the internal clock phases, in this example, may be selectably programmed as a multiple of the frequency of the bus clock.

As is evident in FIG. 3, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114, Of course, microprocessor 110 may also effect bus traffic around cache 114, by treating certain bus reads and writes as "not cacheable". Level 2 cache 114, as shown in FIG. 3, is connected to two level 1 caches 116; level 1 data cache $116_d$ is dedicated to data, while level 1 instruction cache $116_i$ is dedicated to instructions. Power consumption by microprocessor 110 is minimized by only accessing level 2 cache 114 only in the event of cache misses of the appropriate one of the level 1 caches 116. Furthermore, on the data side, microcache 118 is provided as a level 0 cache, and in this example is a fully dual-ported cache.

As shown in FIG. 3 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $142_0$, $142_1$ for processing conditional branch, integer, and logical operations, floating-point unit (FPU) 130, two load-store units $140_0$, $140_1$, and microsequencer 148. The two load-store units 140 utilize the two ports to microcache 118, for true parallel access thereto, and also perform load and store operations to registers in register file 139. Data microtranslation lookaside buffer ($\mu$TLB) 138 is provided to translate logical data addresses into physical addresses, in the conventional manner.

These multiple execution units are controlled by way of multiple pipelines with seven stages each, with write back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register operands indicated by the AOps |
| EX | Execute: This stage runs the execution units according to the AOps and the retrieved operands |
| WB | Write back: This stage stores the results of the execution in registers or in memory |

Referring back to FIG. 3, the pipeline stages noted above are performed by various functional blocks within microprocessor 110. Fetch unit 126 generates instruction addresses from the instruction pointer, by way of instruction microtranslation lookaside buffer ($\mu$TLB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed-length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units. In addition, the operand unit 144 receives and prepares the operands for execution, As indicated in FIG. 3, operand unit 144 receives an input from sequencer 144 and also from microcode ROM 146, via multiplexer 145, and fetches register operands for use in the execution of the instructions. In addition, according to this example, operand unit performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely-used x86 instructions, x86 instructions that modify segment or control registers, handling of exceptions and interrupts, and multicycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Given the description of FIG. 3, as well as the descriptions above such as those relating to the prior Figures, one skilled in the art may appreciate that the circuit embodiments to accomplish the descriptions accompanying FIGS. 1 and 2 may be incorporated in connection with microcode ROM 146 shown in FIG. 3. Various related functionality may be further performed by the appropriate circuitry within FIG. 3.

While the present embodiments have been described in detail, various substitutions, modifications or alterations could be made to the descriptions set forth above without departing from the inventive scope. For example, FIGS. 2a and 2b demonstrate alternative address bit select fields, thereby also giving rise to alternative circuits for decoder 24. As another example, multiplexer 16 need not necessarily be a separate physical multiplexer, but could be replaced with alternative selection circuitry, such as having tristate connections to two logically OR'ed routes, where the non-selected route is tristated at a given instance so that only the alternative route receives the data values. As yet another example, while the least significant bit has been shown as that connected to control the sense amplifiers and, hence, the energizing of microprogram memory banks, a different bit such as the A1 bit could be used instead. As still another example, while only two microprogram memory banks are shown with branching only up to a 4-way branch, the circuits, systems, and methods of operation could be extended to a greater number of microprogram memory banks for a greater number of multiway branches. As yet another example, while FIG. 3 demonstrates one microprocessor system embodiment, various other processors including single pipelined processors could benefit as well. Still another example may alter certain circuits within microprogram memory circuit 12, including those not pertaining to the present embodiments, while still permitting selective energizing of only a portion of the total word line storage area. Still other alternatives will be ascertainable by a person skilled in the art, and all of the above demonstrates the flexibility of the inventive scope which is defined by the following claims.

What is claimed is:

1. A processor, comprising:
a microprogram memory comprising at least a first bank and a second bank, wherein each of the first and second banks is operable to concurrently output a plurality of microinstructions;
circuitry for forming a microaddress for addressing the microprogram memory, said circuitry for forming comprising:
circuitry for determining a value of a first bit from among a set including a plurality of condition values and at least one fixed value designated by a current microinstruction, wherein said fixed value is known before the condition values; and
circuitry for identifying a value of a second bit, wherein the microaddress comprises the first bit, the second bit, and a plurality of main bits;
circuitry responsive to the current microinstruction for determining whether the value of the first bit comprises the fixed value designated by the current microinstruction; and
responsive circuitry responsive to said circuitry for determining that the value of the first bit comprises the fixed value, wherein said responsive circuitry comprises:
circuitry for selectively energizing the first bank or the second bank in response to the value of the first bit;
circuitry for outputting the plurality of microinstructions from the energized bank; and
circuitry for selecting one of the plurality of output microinstructions in response to the value of the second bit.

2. The processor of claim 1 wherein each microinstruction includes a first bit select field and a first bit value, said circuitry for identifying a value of a first bit comprises:
circuitry for decoding the first bit select field from a first microinstruction; and
responsive to said decoding circuitry, circuitry for selecting as the value of the first bit said first bit value of in the first microinstruction if said first bit select field has a Predetermined coding and a value of a one condition value corresponding to a coding of said first bit select field if said first bit select field does not have said predetermined unique coding.

3. The processor of claim 2 wherein each microinstruction includes a second bit select field and a second bit value, and wherein said circuitry for identifying a value of a second bit comprises:
circuitry for decoding the second bit select field from a first microinstruction; and
responsive to said circuitry for decoding the second bit select field, circuitry for selecting as the value of the second bit said second bit value of the first microinstruction if said second bit select field has a second predetermined coding and a value of a one condition value corresponding to a coding said second bit select field if said second bit select field does not have said second predetermined coding.

4. The processor of claim 1 wherein each microinstruction includes a first bit select field, said circuitry for identifying a value of a first bit comprises:
circuitry for decoding the first bit select field from a first microinstruction; and
responsive to said circuitry for decoding, circuitry for selecting as the value of the first bit a first fixed bit value if said first bit select field has a first predetermined coding, a second fixed bit value opposite to said first fixed bit value if said first bit select field had a second predetermined coding and a value of a one condition value corresponding to a coding of said first bit select field if said first bit select field does not have either said first predetermined coding or said second predetermined coding.

5. The processor of claim 4 wherein each microinstruction further includes a second bit select field, and wherein said circuitry for identifying a value of a second bit comprises:
circuitry for decoding the second bit select field from the first microinstruction; and responsive to said circuitry for decoding a second bit select field, circuitry for selecting as the value of the second bit a third fixed bit value if said second bit select field has a third predetermined coding a fourth fixed bit value opposite to said third fixed bit value if said second bit select field had a fourth predetermined coding and a value of a one condition value corresponding to a coding of said second bit select field if said second bit select field does not have either said third predetermined coding or said fourth predetermined coding.

6. The processor of claim 1 and further comprising:

circuitry for determining whether the value of the second bit comprises a fixed value;

responsive to said circuitry for determining that the value of the first bit comprises a fixed value and said circuitry for determining that the value of the second bit comprises a fixed value:

circuitry for selectively energizing the first bank or the second bank in response to the value of the first bit;

circuitry for outputting two microinstructions from the energized bank; and circuitry for selecting one of the two output microinstructions in response to the value of the second bit.

7. The processor of claim 1 and further comprising:

circuitry for determining whether the value of the second bit comprises a fixed value;

responsive to said circuitry for determining that the value of the first bit does not comprise a fixed value and said circuitry for determining that the value of the second bit does not comprise a fixed value:

circuitry for energizing the first bank and the second bank to output two microinstructions from each of the first bank and the second bank;

circuitry for selecting the plurality of microinstructions from the first bank or the second bank in response to the value of the first bit; and responsive to the value of the second bit, circuitry for selecting one of the plurality of microinstructions from the plurality of microinstructions selected in response to the value of the first bit.

8. The processor of claim 1 and further comprising:

circuitry for determining whether the value of the second bit comprises a fixed value;

responsive to said circuitry for determining that the value of the first bit does not comprise a fixed value and said circuitry for determining that the value of the second bit comprises a fixed value:

circuitry for energizing the first bank and the second bank to output the plurality of microinstructions from each of the first bank and the second bank;

circuitry for selecting one plurality of microinstructions from the first bank or the second bank in response to the value of the first bit; and responsive to the value of the second bit, circuitry for selecting one of the plurality of output microinstructions from the plurality of microinstructions selected in response to the value of the first bit.

9. A method of operating a microprogram memory comprising at least a first bank and a second bank, wherein each of the first and second banks is operable to concurrently output a plurality of microinstructions, said method comprising the steps of:

forming a microaddress for addressing the microprogram memory, said forming step comprising the steps of:

receiving a microaddress main portion comprising a plurality of main bits;

determining a value of a first bit from among a set including a plurality of condition values and at least one fixed value designated by a current microinstruction, wherein said fixed value is known before the condition values; and identifying a value of a second bit, wherein the microaddress comprises the plurality of main bits, the first bit, and the second bit;

determining responsive to the current microinstruction whether the value of the first bit comprises the fixed value designated by the current microinstruction; and in response to determining that the value of the first bit comprises the fixed value, the steps of:

selectively energizing the first bank or the second bank in response to the value of the first bit;

outputting the plurality of microinstructions from the energized bank; and selecting one of the plurality of output microinstructions in response to the value of the second bit.

10. The method of claim 9 wherein each microinstruction includes a first bit select field and a first bit value, and said step of identifying a value of a first bit comprises:

decoding the first bit select field from a first microinstruction; and in response to said decoding step, selecting as the value of the first bit said first bit value of in the first microinstruction if said first bit select field has a predetermined coding and a value of a one condition value corresponding to a coding of said first bit select field if said first bit select field does not have said predetermined unique coding.

11. The method of claim 10 wherein each microinstruction includes a second bit select field and a second bit value, and wherein said step of identifying a value of a second bit comprises:

decoding the second bit select field from a first microinstruction; and in response to said step of decoding the second bit select field, selecting as the value of the second bit said second bit value of the first microinstruction if said second bit select field has a second predetermined coding and a value of a one condition value corresponding to a coding said second bit select field if said second bit select field does not have said second predetermined coding.

12. The method of claim 9 wherein each microinstruction includes a first bit select field, said step of identifying a value of a first bit comprises:

decoding the first bit select field from a first microinstruction; and in response to said decoding step, selecting as the value of the first bit a first fixed bit value if said first bit select field has a first Predetermined coding, a second fixed bit value opposite to said first fixed bit value if said first bit select field had a second predetermined coding and a value of a one condition value corresponding to a coding of said first bit select field if said first bit select field does not have either said first Predetermined coding or said second predetermined coding.

13. The method of claim 12 wherein each microinstruction includes a second bit select field, and wherein said step of identifying a value of a second bit comprises:

decoding the second bit select field from the first microinstruction; and in response to said step of decoding a second bit select field, selecting as the value of the second bit a third fixed bit value if said second bit select field has a third predetermined coding, a fourth fixed bit value opposite to said third fixed bit value if said second bit select field had a fourth predetermined coding and a value of a one condition value corresponding to a coding of said second bit select field if said second bit select field does not have either said third predetermined coding or said fourth predetermined coding.

14. The method of claim 9 and further comprising the steps of:

determining whether the value of the second bit comprises a fixed value;

in response to determining that the value of the first bit comprises a fixed value and determining that the value of the second bit comprises a fixed value, the steps of:

selectively energizing the first bank or the second bank in response to the value of the first bit;

outputting two microinstructions from the energized bank; and selecting one of the two output microinstructions in response to the value of the second bit.

15. The method of claim 9 and further comprising the steps of:

determining whether the value of the second bit comprises a fixed value;

in response to determining that the value of the first bit does not comprise a fixed value and determining that the value of the second bit does not comprise a fixed value, the steps of:

energizing the first bank and the second bank to output two microinstructions from each of the first bank and the second bank;

selecting the plurality of microinstructions from the first bank or the second bank in response to the value of the first bit; and in response to the value of the second bit, selecting one of the plurality of microinstructions from the plurality of microinstructions selected in response to the value of the first bit.

16. The method of claim 9 and further comprising the steps of:

determining whether the value of the second bit comprises a fixed value;

in response to determining that the value of the first bit does not comprise a fixed value and determining that the value of the second bit comprises a fixed value, the steps of:

energizing the first bank and the second bank to output the plurality of microinstructions from each of the first bank and the second bank;

selecting one plurality of microinstructions from the first bank or the second bank in response to the value of the first bit; and in response to the value of the second bit, selecting one of the plurality of output microinstructions from the plurality of microinstructions selected in response to the value of the first bit.

* * * * *